United States Patent Office.

HORACE KOECHLIN, OF LORRACH, BADEN, AND OTTO N. WITT, OF MUL-HAUSEN, ALSACE, GERMANY.

MANUFACTURE OF BLUE AND VIOLET COLORING-MATTERS.

SPECIFICATION forming part of Letters Patent No. 261,518, dated July 18, 1882.

Application filed April 30, 1881. (Specimens.) Patented in France March 19, 1881, No. 141,843; in Germany March 19, 1881, No. 15,915; in England March 28, 1881, No. 1,373; in Belgium April 4, 1881, No. 54,288; in Austria April 23, 1881, No. 1,695, and in Sweden May 25, 1881.

*To all whom it may concern:*

Be it known that we, HORACE KOECHLIN, of Lorrach, in the Duchy of Baden, Germany, and OTTO N. WITT, of Mulhausen, in the Province of Alsace, Germany, have invented a certain new and useful Improvement in Coloring-Matters, of which improvement the following is a full description.

This invention has reference to the production of coloring-matters by reactions with nitroso or paramido bodies, or the chloroquinonimides; and it consists in reacting upon a phenol with a nitroso amine or phenol or a chloroquinonimide in the presence of a reducing agent, or with a paramido body in the presence of an oxidant, and in the products of said reaction. The coloring-matters produced are for the most part blue or violet, and range between these colors. They can be obtained in a free state or developed directly in or upon the fabric, yarn, or fiber, and can be applied by a dye-bath or by printing. The desired reaction with nitroso bodies and phenols is obtained when the nitroso derivatives of the tertiary aromatic amines or of the phenols, or the bodies recently described under the name of "chloroquinonimides," are placed in presence of the alkaline or ammoniacal salts of the phenols—such as phenol $C_6H_6O$, naphthol $C_{10}H_8O_2$, resorcine $C_6H_6O_2$, orcine $C_7H_8O_2$—by the addition to mixtures of these materials of a reducing agent—such as zinc powder, protoxide of tin, glucose, &c. The same coloring-matters are formed, and the formation is cleaner and more complete, by treating a mixture (alkaline, neutral, or acid) of a phenol, and particularly the phenols mentioned above, and a paramido derivative—such as paraphenylenediamine, paramidodimethylaniline, paramidophenol—with an oxidating agent, such as metallic chromates, ferro-cyanides, and hypochlorites.

To give an example of the manner in which the invention may be carried into effect, the production of a blue coloring-matter by means of phenol and paramidodimethylaniline will now be described.

In a wooden vessel or tank ten kilos of nitrosodimethylaniline (chlorohydrate) are dissolved in one hundred liters of water at 45° to 50° centigrade. Ten kilos of zinc powder are added, and the liquor is stirred until the nitroso body is completely reduced. The zinc is then allowed to settle, and the clear liquor is separated by filtration and washing of the residue. In another vessel or tank a mixture is made (or has been previously made) of twelve kilos pure phenol, twelve liters caustic soda at 38° Baumé, two hundred liters water, and ten kilos bichromate of potash. This mixture is turned into the solution of paramidodimethylaniline, the clear liquor from the operation first described, and acetic acid of commerce is added. The coloring-matter forms instantaneously, and is deposited in the form of dark-blue powder. It is subjected to the action of a filter-press, and dried at a temperature not exceeding 60° centigrade.

Messrs. Witt and Meldola have described a series of coloring-matters obtained at the temperature of ebullition by the action of acetic solutions of the phenols upon nitrosodimethylaniline; but they are entirely different from those produced in accordance with this invention, and ought not to be confounded with them.

In place of preparing the coloring-matters in a free state, they can, as before stated, be produced directly upon fabrics, and fast colors which resist the action of light and washing with soap are thus obtained. This result may be obtained by applying the reagents in proper form and proportions and then steaming. The special claim to the direct fixation or development of these colors on fiber is, however, reserved for a separate and subordinate application, and a more particular and detailed description of the manner of effecting the said direct fixation or development will therein be set forth.

It is obvious that the invention is not limited to the particular phenols specified, but includes other phenols which react in the same manner there as and are the equivalents thereof.

Having now fully explained the said invention and the manner of carrying the same into effect, what we claim is—

1. The formation of blue and violet coloring-matter by the reaction upon a phenol, under the conditions indicated, of a nitroso amine or phenol or a chloroquinonimide in the presence of a reducing agent or a paramido body in the presence of an oxidizing agent, substantially as described.

2. A blue or violet coloring-matter produced by the reaction as above described, and having the characteristics set forth.

In witness whereof we have hereunto signed our names in the presence of two subscribing witnesses.

HORACE KOECHLIN.
OTTO N. WITT.

Witnesses:
E. HUGUNIN KOECHLIN,
E. SPOERLEIN HEILMANN.